United States Patent [19]

Gappa

[11] 4,304,981
[45] Dec. 8, 1981

[54] METHOD FOR IDENTIFYING OR MARKING PANELS AND STRIPS

[75] Inventor: Klaus Gappa, Dortmund, Fed. Rep. of Germany

[73] Assignee: Estel Hoesch Werke Aktiengesellschaft, Dortmund, Fed. Rep. of Germany

[21] Appl. No.: 91,144

[22] Filed: Nov. 5, 1979

Related U.S. Application Data

[63] Continuation of Ser. No. 910,277, May 30, 1978, abandoned.

[30] Foreign Application Priority Data

Jun. 11, 1979 [DE] Fed. Rep. of Germany ....... 2726454

[51] Int. Cl.³ .............................................. B23K 26/08
[52] U.S. Cl. ....................... 219/121 LF; 219/121 LB; 219/121 LJ; 209/3.3; 209/566; 346/76 L
[58] Field of Search .... 219/121 L, 121 LM, 121 LA, 219/121 LB, 121 LE, 121 LF, 121 LH, 121 LJ; 346/76 L; 209/3.3, 565, 566

[56] References Cited

U.S. PATENT DOCUMENTS

| | | | |
|---|---|---|---|
| 2,306,211 | 12/1942 | Geiss | 209/3.3 X |
| 2,312,626 | 3/1943 | Chamberlin et al. | 209/3.3 X |
| 3,070,227 | 12/1962 | Larew et al. | 209/565 |
| 3,293,652 | 12/1966 | Roshon, Jr. et al. | 219/121 LK X |
| 3,325,819 | 6/1967 | Fraser | 219/121 LB X |
| 3,622,742 | 11/1971 | Cohen | 219/121 LB X |
| 3,803,637 | 4/1974 | Martin et al. | 346/76 L |
| 3,898,417 | 8/1975 | Atkinson | 219/121 LA |
| 4,024,545 | 5/1977 | Dowling et al. | 346/76 L |

Primary Examiner—Gene Z. Rubinson
Assistant Examiner—Keith E. George
Attorney, Agent, or Firm—Max Fogiel

[57] ABSTRACT

A method for applying identification markings on surfaces of moving panels and strips, preferably steel sheets and steel strips. The method is particularly applicable at high speeds, in which the surface of the moving panel or strip between an inspection station and an identification or marking station, is divided into zones of a length equivalent to the marking to be applied. Every individual zone between inspection station and identification or marking station is traced electronically, and the surface of each traced zone is oxidized and melted by a laser light source. Each zone is assigned a location in a shift register associated to an inspection station, and each inspection station is assigned several inspection tasks. A shift register is used for each inspection task. Information items originating from various inspection tasks are recorded in individual shift registers at locations assigned to an individual zone. The shift registers are controlled by a clock generator synchronously with the speed of the panels or strips, and synchronously with one another.

14 Claims, 5 Drawing Figures

METHOD FOR IDENTIFYING OR MARKING PANELS AND STRIPS

This is a continuation of application Ser. No. 910,277 filed May 30, 1978, now abandoned.

BACKGROUND OF THE INVENTION

The present invention relates to a method for placing identification markings on the surface of moving panels and strips, particularly at high speeds, of steel sheets and steel sheet belts.

Methods for identifying or marking moving panels or strips are known in various arrangements. Such identification is possibly by means of color or magnetically or mechanically. Each of these methods has advantages and disadvantages.

The disadvantage with color marking is the fact that there is not known any paint which dries quickly as required with high speed strips and which will not plug the nozzles of paint spray devices. Also, the paint adheres poorly to the usually oil surface of the steel strips or of the panels and detaches when the pass through conveyor rollers or straightening machines. Also, the paint cannot be applied as desired at the defect location since the paint spray mechanism does not permit precise identification within the brief time interval predetermined by the speed of the installation.

Identification by local magnetization of the steel strip or of the panel also is not permanent, and is transmitted by the "rubber stamp effect" in coils or panel stacks to the adjacent coil windings or panels; this results in incorrect identification in a subsequent read and sorting device.

Mechanical identification can be applied, for example, by a mechanical marker (scribe). It is permanent, but very conspicuous and has disadvantages resulting from the quick movement of mechanical parts, a wide scattering of the marking with respect to length, location and line thickness; in addition, it causes considerable noise, and the operational frequency of such devices is small.

Because of the above disadvantages, none of the above methods can be used for marking defects in the manufacture of tin-plate steel strips. Usually, defects on steel strips, particularly tin-plated steel strip, are detected directly at the end of the tin-plating installation. After they have been detected, the production process is properly corrected or even interrupted. Defects already having occurred on the finished tin-plate strip, however, cannot be identified (marked) in order to reidentify them during the remainder of the treatment and to sort out defective pieces, because of the high strip speed and the known method not being usable for this reason.

Observation of the strip for defects must therefore be carried out anew in later treatment (process) steps, such as, for example, splitting up the strip into panels, and sorting the panels. The required expenditure for providing the consumer with strip or panels satisfying his requirements is relatively large because of these repeated inspections.

It is, therefore, an object of the present invention to avoid the disadvantages of the above methods and to provide a method for permitting a permanent, and highly inconspicuous, but clearly recognized identification on a running strip or a panel, independently of the transport speed at the location of the defect; the length of the identification associated with the particular defect is to be as short as possible, in order to identify rapidly successive defects discretely, i.e., singly, and to reduce the previously required multiple inspections to a minimum.

Another object of the present invention is to provide a method of the foregoing character, which may be simply and economically applied.

A further object of the present invention is to provide a method, as described, which may be readily maintained in service.

SUMMARY OF THE INVENTION

The objects of the present invention are achieved by providing that the surface of the panel or of the strip is divided between an inspection station and the identification (marking) station into zones of a length equivalent to the identification to be applied. Every single zone between the inspection station and the identification station is traced electronically and the surface of each traced zone is oxidized and melted by a laser light source.

Each zone is assigned a location in a shift register assigned to the inspection station. It is expedient to assign to each inspection station several inspection tasks; for example, to detect excessively thin or excessively thick metal sheets, with a shift register provided for each inspection task. Information items from the various inspection stations are recorded at the individual shift register locations assigned to the individual zone. All information items from the inspection stations pertaining to a certain zone are being maintained in a fixed relation to one another and are available to keep track of the zones. This is accomplished by controlling the shift registers synchronously with the speed of the panels or of the strip and synchronous with one another by a clock generator. Synchronizing the shift registers with the strip speed and with one another results in an electronic tracking of the zones to be isolated and later marked throughout the entire distance traversed, i.e., from the first inspection station up to the marking location, independent of the speed of the panels or the strip.

At the marking location, the information items from the individual shift registers are delivered simultaneously or successively to the selection unit of the laser light source and converted simultaneously or successively into laser light pulses. The action of the laser light source proceeds virtually without delay. This means that the time defined pulse sequence from the shift registers can be converted into a precisely assigned laser pulse sequence.

The information items pertaining to the tracked zone to be marked arrive at the end of the passage time, i.e., at the end of the shift registers at the same time in all registers. It is necessary—independent of the marking procedure (marking in the run direction of the panel or of the strip or transverse to the run direction)—to convert this parallel information into a series information in order to have the laser light source also produce a series laser pulse sequence for marking in the run direction. This conversion of the parallel or simultaneous information items into series information times, i.e., into successive information for actuation of the laser light source is done by a temporary storage shift register.

The advantages of the method in accordance with the present invention are that continuously moving strips and panels, especially those moving at high speeds, for example, tin-plate sheet steel having defects such as thickness, puncture and surface defects, can have a permanent, inconspicuous but clearly identifiable marking, to be recognized, for example, by an optical readout device at a well-defined location, i.e., at the defective spot. This identification (marking) applied in accordance with the invention is so permanent that it is not damaged during unavoidable mechanical stress applications, for example, during shipping, and does not change unduly while the belt or panels are being stored.

Another advantage of the method in accordance with the invention is that the marking is located at the site (height level) of the defect so that its distance from the defect—measured in the belt running direction—is a minimum. This ensures that upon splitting the strip into panels, the probability of a separation of defects and their associated marking is very small. Another advantage of the method in accordance with the present invention is that the previously required multiple inspections are reduced to a minimum in a simple and economical manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
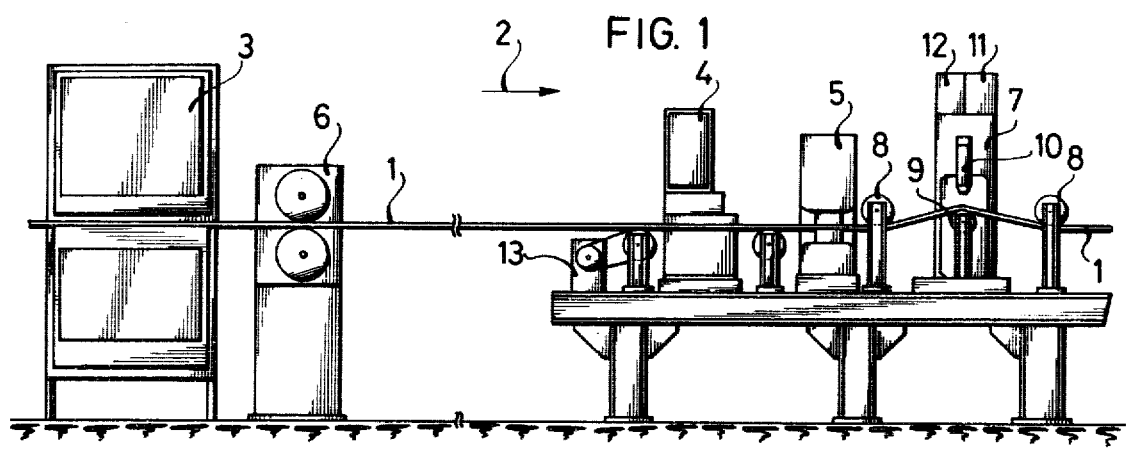
FIG. 1 is a schematic elevational view and shows a layout of equipment.

Referring to FIG. 1, a tin-plated strip 1, coming from the tin-plating unit (not shown) travels in the direction of arrow 2 and passes an inspection device 3 where it is inspected for surface defects. The inspection device 3 is followed by two further inspection devices 4 and 5; device 4 is for locating perforations (holes) and device 5 is for locating thickness defects. Strip 1 is moved from inspection device 3 to the other inspection devices 4 and 5 by means of a drive unit 6. Immediately following the last inspection device 5 is an identification and marking station 7 which is entered and exited by strip 1 via guide rollers 8 and 9. The identification station 7 is a laser light source and has a laser head 10 for beam control and a selection unit 11. The selection unit 11 of the laser light source identifies or oxidizes and melts strip 1 passing through, and the unit receives its impulses from the electronic arrangement 12 described in FIG. 3. The laser beam generated by the laser light source is directed via laser head 10 to the strip 1 and marks belt 1 on the basis of the information obtained from inspection devices 3, 4 and 5. The strip 1 thus marked is wound onto a reel (not shown). In a similar manner, the marking may also be applied to the strip in a strip split-up unit before split-up, or directly after split-up to the individual sheet metal panels.

Figure 2:
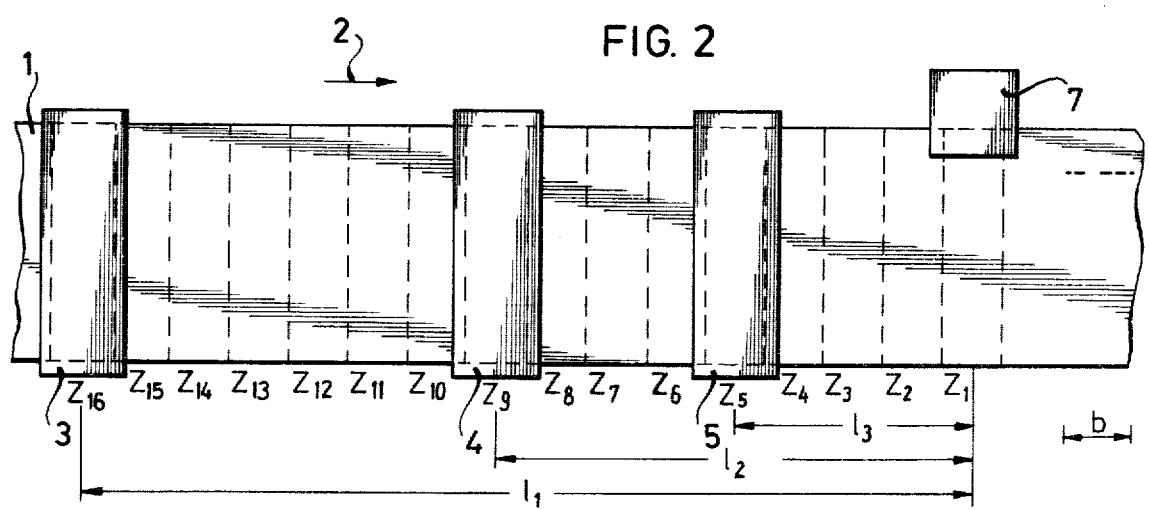
FIG. 2 is a plan view and shows a division of a strip section into zones.
Figure 3:
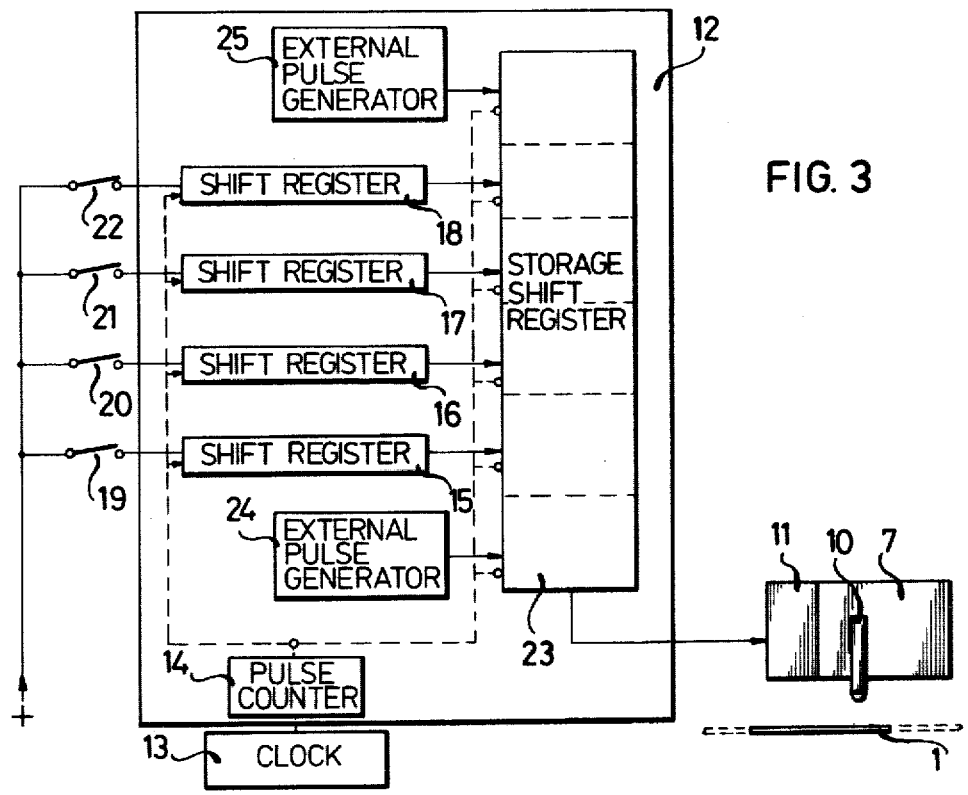
FIG. 3 shows a schematic function or operations diagram.

FIG. 2 shows a portion of strip 1 which successively passes inspection devices 3, 4 and 5 in the direction of arrow 2. While the strip is in motion, strip 1 is divided into zones Z by means of a clock 13 synchronized to the strip speed (FIG. 3). For this purpose, the clock 13 produces pulses with the identical time interval. For example, 10 pulses correspond to a 60 mm travel of belt 1. These pulses are delivered to a pulse counter 14, where they are counted and divided into groups of 10 pulses each, so that, as shown in FIG. 2, zones $Z_1$ to $Z_{16}$, have the length of the identification marking develop between the inspection device 3 and the identification (marking) station 7.

At the end of each group of 10 pulses, i.e., at the end of each zone Z, the pulse counter 14 delivers a shift pulse to shift registers 15 to 18. In shift registers 15 to 18 which contain storage locations, the shift register 15 is associated with the surface defects found in device 3, shift register 16 is associated with the hole (puncture) defects found in device 4, and shift registers 17 and 18 are associated with the thickness defects found in device 5.

As a result of the shift pulse, the storage location assigned to a zone $Z_1$ to 16 in each shift register 15 to 18 is shifted by one digit, towards the end of shift registers 15–18. Parallel to this action, a given zone Z passes inspection devices 3, 4 and 5. If a defect is detected, for example by the inspection device 3, this inspection device 3 delivers a write pulse to the storage location kept open in shift register 15 for this zone Z. In an analog manner, write pulses are delivered from inspection devices 4 and 5 to the storage locations in shift registers 16, 17 and 18.

Figure 3A:
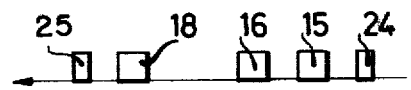
FIG. 3a shows a pulse sequence as a function of time, and delivered from a temporary storage shift register in FIG. 3.
Figure 3B:
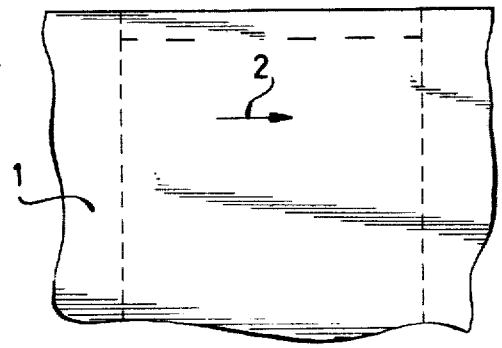
FIG. 3b is a partial schematic plan view and shows the manner in which a laser light marks a strip by oxidizing and melting the surface.

Now zone Z has passed all inspection devices 3 to 5 and has arrived at identification station 7. Parallel with this action, the storage locations associated with this zone Z with the recorded defect information, have arrived in shift registers 15 to 18 at the end of these registers. To transform the parallel information into serial information, this information is delivered to temporary storage shift register 23 so that all information pertaining to zone Z is stored together in temporary storage shift register 23. In addition to this defect information, external pulse generators 24 and 25 identify beginning and end of defect information items for a zone Z by a begin and end pulse. Via the pulse counter 14, the temporary storage shift register 23 receives another shift pulse through which the defect information, including the begin and end pulse, are passed from the temporary storage shift register 23 to the selection unit 11 of the laser light source. The selection unit 11 causes the conversion of the arrived electronic pulse sequence, as shown in FIG. 3a, into a pulse sequence of the laser light. The pulse sequence in FIG. 3a shows the sequence of information items or pulses which were delivered from the temporary storage shift register 23 to the selection unit 11 of the laser light source, plotted against time t. The laser light marks strip 1 in the manner shown in FIG. 3b by oxidizing and melting the surface. The identification (marking) sequence applied to strip 1 in FIG. 3b corresponds to the pulse sequence shown by the schematic in FIG. 3a. The information from the individual shift registers, may also be delivered simultaneously to the selection unit 11. The information items may then be converted simultaneously into laser light pulses.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What I claim is:

1. A method for marking surfaces of moving panels and strips, comprising the steps of: dividing a surface of a panel or strip between an inspection station and a marking station into zones having a length equivalent to length of a marking to be applied; tracing electronically each zone between said inspection station and said marking station synchronously with the speed of movement of said panels; oxidizing and melting the surface of the traced zone by a laser light source controlled by electronic means for marking the zone; said marking being applied at the site of a defect of said panel or strip so that the distance of said marking from the defect is a minimum; said marking containing information on the character of the defect, marking of a zone producing also thereby marking of sheets which may be cut from a strip.

2. A method as defined in claim 1 including the step of assigning each zone to a location in a shift register, said shift register being associated with an inspection station.

3. A method as defined in claim 2 including the step of assigning to each inspection station a plurality of inspection tasks, and assigning a shift register to each inspection task.

4. A method as defined in claim 3 including the step of recording information originating from inspection tasks in individual shift registers at locations assigned to an individual zone.

5. A method as defined in claim 4 including the step of controlling said shift registers synchronously by a clock generator with the speed of motion of said moving panels or strips, and controlling said shift registers synchronously with one another.

6. A method as defined in claim 4 including the step of delivering information from the individual shift registers to a selection unit of a laser light source, and converting the information into laser light pulses.

7. A method as defined in claim 6 wherein said information from the individual shift registers comprises information items delivered simultaneously to said selection unit.

8. A method as defined in claim 7 wherein said information items are converted simultaneously into said laser light pulses.

9. A method as defined in claim 6 wherein said information from the individual shift registers comprises information items delivered successively to said selection unit.

10. A method as defined in claim 9, wherein said information items are converted successively into laser light pulses.

11. A method as defined in claim 4 including the step of converting information items appearing simultaneously into information items following each other successively by an intermediate shift register.

12. A method as defined in claim 1 wherein said moving panels and strips comprise steel sheets and steel strips moving at substantially high speeds.

13. A method as defined in claim 1 including the steps of: assigning each zone to a location in a shift register, said shift register being associated with an inspection station; assigning to each inspection station a plurality of inspection tasks, and assigning a shift register to each inspection task; recording information originating from inspection tasks in individual shift registers at locations assigned to an individual zone; controlling said shift registers synchronously by a clock generator with the speed of motion of said moving panels or strips, and controlling said shift registers synchronously with one another; delivering information from the individual shift registers to a selection unit of a laser light source, and converting the information into laser light pulses; converting information items appearing simultaneously into information items following each other successively by an intermediate shift register; said moving panels and strips comprising steel sheets and steel strips moving at substantially high speeds; said information from the individual shift registers comprising information items delivered simultaneously to said selection unit; said information items being converted simultaneously into said laser light pulses.

14. A method as defined in claim 1, wherein said surface is divided electronically into zones of predetermined length, said zones receiving coded markings depending on defects present, said zones being traced by shift registers synchronous with the speed of motion of said surface.

* * * * *